UNITED STATES PATENT OFFICE.

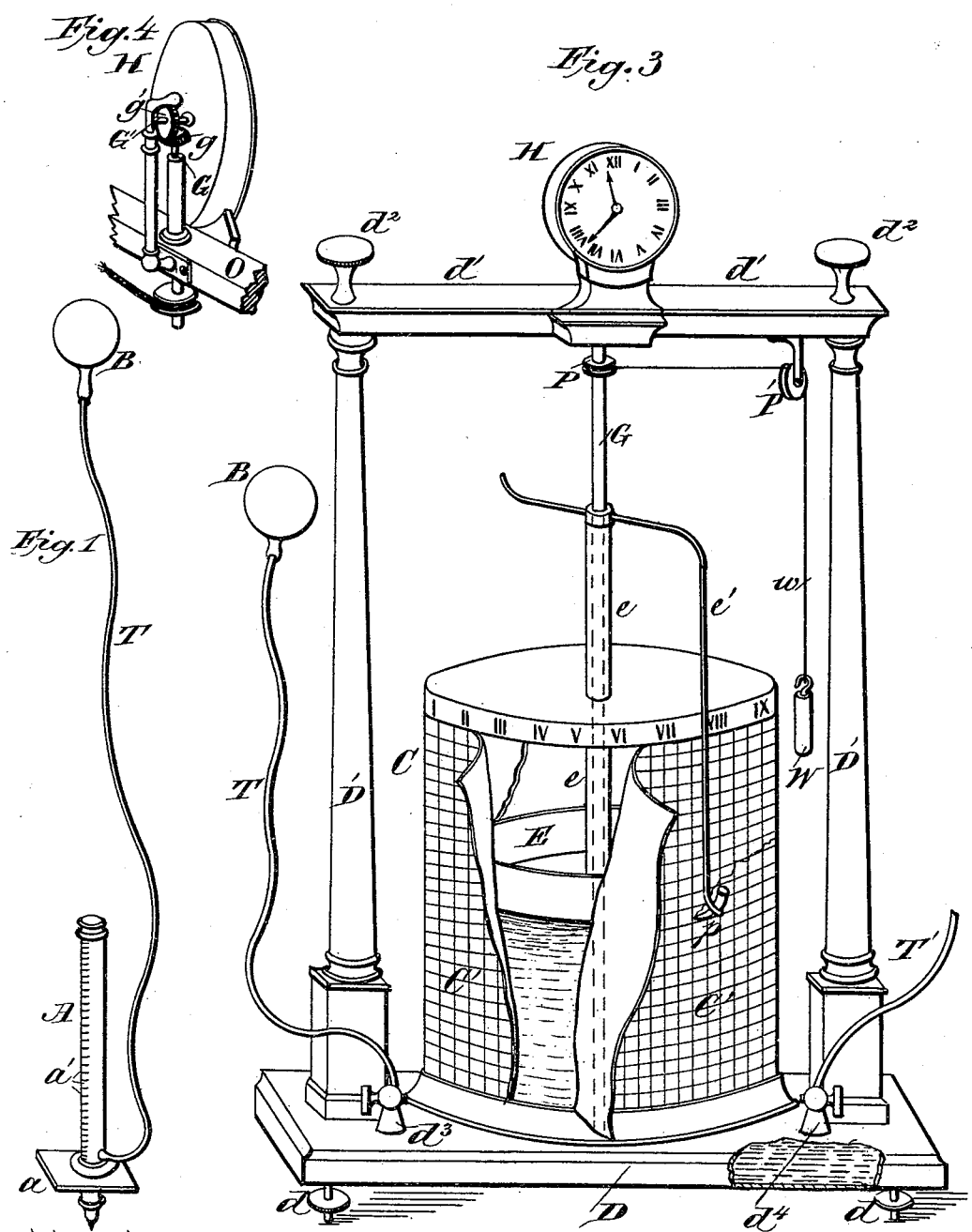

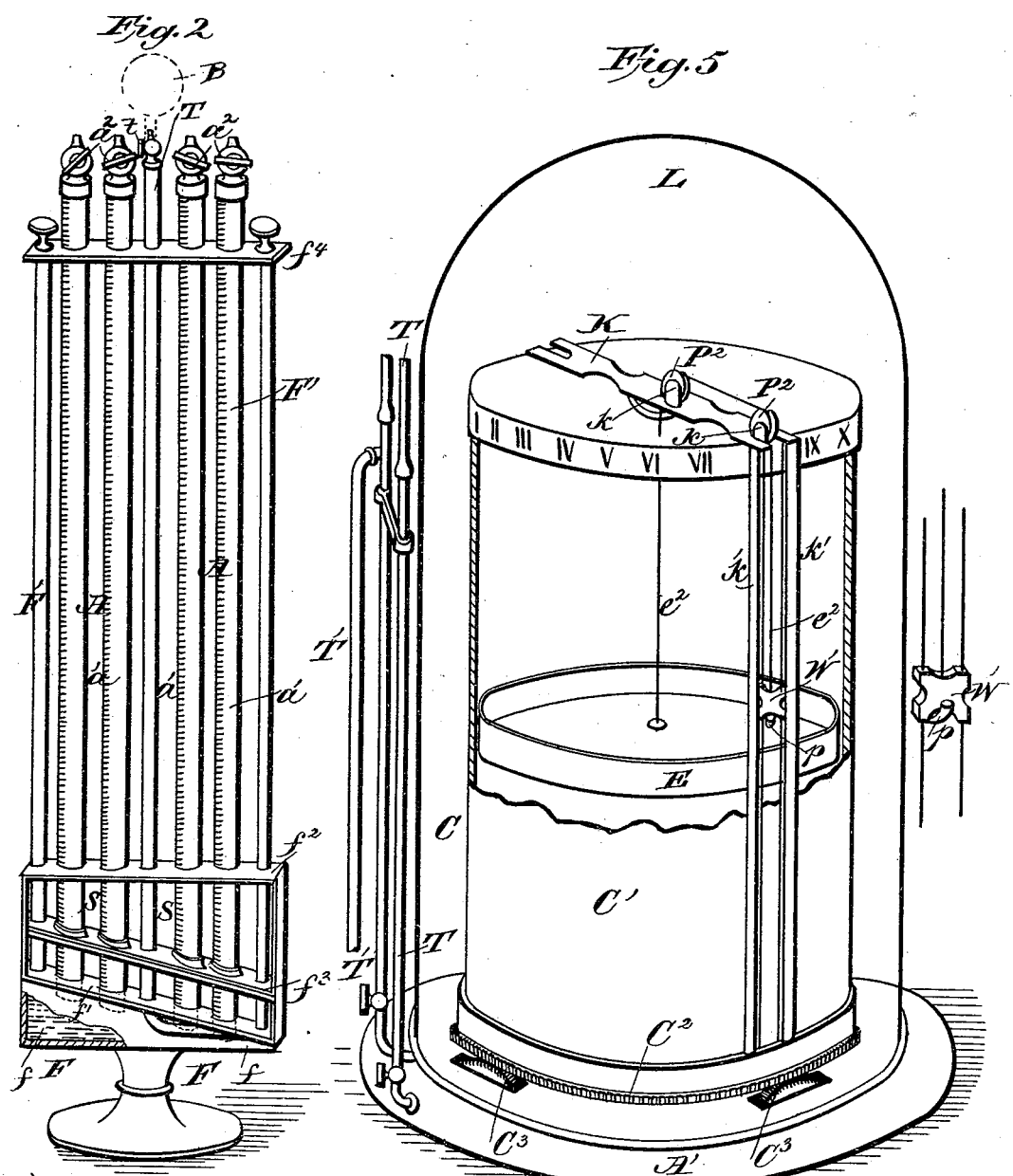

ANTONIO BONINO, OF TOREA, ITALY.

BAROMETRICAL EVAPOROMETER.

SPECIFICATION forming part of Letters Patent No. 351,091, dated October 19, 1886.

Application filed September 4, 1886. Serial No 212,740. (No model.) Patented in Belgium November 16, 1885, No. 70,681.

*To all whom it may concern:*

Be it known that I, ANTONIO BONINO, a citizen of the Kingdom of Italy, residing at Torea, in Italy, have invented certain new and useful Improvements in Barometrical Evaporometers, (for which I have obtained Letters Patent of Belgium, No. 70,681, dated November 16, 1885;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a novel construction of apparatus for ascertaining and recording atmospheric changes through the medium of a liquid subjected to influences of the atmosphere—apparatus which I have called a "barometric evaporometer."

The invention consists, broadly, of a porous hollow body, preferably a sphere connected by a tube with the receiver for the liquid, provided with means for indicating the amount of evaporation of the liquid under varying atmospheric conditions, or for making a permanent record of the volume of liquid evaporated by automatically tracing the variations in the level of the liquid within the receiver.

Referring to the accompanying drawings, Figure 1 shows the apparatus in its simplest form by an isometric view. Fig. 2 is a like view of a modification of the same. Fig. 3 shows a self-recording apparatus, also by an isometric view. Fig. 4 is an isometric detail view of Fig. 4, and Fig. 5 is an isometric view of a modified arrangement of the apparatus shown in Fig. 3.

In its simplest form the barometric evaporometer consists of a graduated tube or eprouvette, A, supported in any suitable manner from a bar or stand, $a$.

B is a hollow sphere, of any suitable porous material—such as kiln-dried or unglazed earthenware or other appropriate material—connected with the eprouvette A, at the base thereof, by means of a tube, T, giving it the appearance of a water-barometer.

The eprouvette may be supplied with any suitable or desired liquid—as water or other liquid—which, under the pressure of the air in the eprouvette, is forced into the porous sphere B through the tube T. The liquid in the sphere B, owing to capillarity, tends to pass through its pores to the outer surface thereof, and there again encounter atmospheric pressure that antagonizes it and prevents the passage of said liquid, except in the form of vapor by incorporation with the atmosphere. The operation of the apparatus, as will be seen, is therefore based upon the principle of equilibrium of these two antagonizing forces—namely, capillarity and atmospheric pressure. As the ambiant air takes up the moisture from the surface of the sphere, the level of the liquid in the eprouvette is lowered, thus indicating the condition of the atmosphere by volume of moisture taken up. It is obvious that the drier the atmosphere the greater will be the volume of water evaporated, and vice versa.

Experiments have demonstrated that this apparatus has the property of indicating not only the degree of dryness of the atmosphere by a lowering of the level of the liquid in the eprouvette, but also the precipitation of moisture from the atmosphere due to sudden atmospheric changes and resulting in fog or dew, or lighter precipitation of moisture by an inverse change in the level of the liquid in the eprouvette. In the former case the level of the liquid will fall in proportion according as the atmosphere is more or less rarefied or dry, while in the latter case the level will, on the contrary, rise in the eprouvette in proportion to the amount of moisture precipitated from the atmosphere.

In Fig. 2 I have shown an apparatus of greater capacity than that shown in Fig. 1, and constructed to indicate the variations in the level of the liquid. It consists, essentially, of a series of tubes, A, open at their lower ends, and provided at their upper end with a stop-cock, $a^2$. They are arranged parallel to one another in a suitable stand or frame, F, the lower portion whereof constitutes a receiver, $f$, having an inclined top, $f'$, into which the lower open end of the tubes A are fitted. The tubes are supported in a vertical position by means of the cross-bars $f^2 f^3$, the former cross-bar being parallel with the bottom of the receiver or lower part of the stand, and the cross-bar $f^3$ parallel with the inclined top of the said receiver, thus holding the tubes securely in position with their lower ends on an inclined plane. Each tube A has suitable graduations, $a'$, and said tubes are supported at their upper ends in a cross-bar, $f^4$, connected with the base by means of tie-rods, standards, or equivalents devices, $F'$.

By arranging the lower open ends of the tubes A on an inclined plane within a receiver, the area of which is gradually contracted in the direction of said inclined plane, as shown in Fig. 2, the series of tubes practically form one continuous long tube, and may thus be arranged within a comparatively small space one after the other, emptying into the receiver or reservoir $f$ as the evaporation progresses. Of course it will be understood that the reservoir $f$ must necessarily be air-tight in order to obtain the results aimed at.

T is the tube to which the porous hollow sphere is connected at the upper end, the lower end of said tube T being connected with the reservoir $f$ at its shallowest point.

The tubes A are preferably simultaneously filled in any convenient manner by opening the stop-cocks $a^2$ and introducing the liquid through their upper ends. All the stop-cocks of the tubes are then closed except the one of the end tube which communicates with the reservoir at its highest point, the stop-cock $t$ in tube T being open to admit the liquid to sphere B, which is shown in dotted lines in Fig. 2.

It is obvious that when the contents of the end tube are evaporated, the air entering the reservoir through said tube will permit the liquid from the next tube to pass into the reservoir as it is evaporated in the sphere, and so on one tube after another will empty into the reservoir $f$ until all are empty, the graduations $a'$ on said tubes indicating the changes in the level of the liquid within the tubes. I thus obtain a barometric evaporometer of much greater capacity than that shown in Fig. 1, without thereby increasing the dimensions of the apparatus very materially.

In Fig. 3 I have shown a self-recording apparatus, in which the principles above described are embodied. This instrument is composed of a stand consisting of a hollow base or receiver, D, supported by adjusting-screws $d$, for purposes of leveling the apparatus, of a cylinder, C, open at it lower end and secured air-tight to a corresponding opening in the hollow base D, of a float, E, connected to a hollow float rod or stem $e$, through which passes a supporting-rod or vertical shaft, G, the lower end whereof is stepped on the bottom of the hollow base D in any usual or preferred manner, so as to be free to rotate, of a train of clock-gearing connected with the shaft G through the medium of a bevel-pinion, $g$, on the upper end of shaft G, and a bevel-pinion, $g'$, on the main driving-arbor $G'$ of the clock mechanism, which I have deemed unnecessary to illustrate, as any suitable time mechanism may be employed.

In Fig. 3 I have shown the clock-case H, and in Fig. 4 I have shown the same by a detached view and the connections between the shaft G and the driving-arbor of the clock mechanism. The latter and its inclosing-case H are supported by a suitable shelf, $d'$, secured on the standards or columns $D'$ by means of screws $d^2$, or in any other desired manner. The clock mechanism is operated from a weight, W, suspended from a cord, $w$, that passes over a guide-pulley, $P'$, and is wound on a pulley, P, secured to shaft G. The float is connected with the shaft G, through the medium of its hollow stem $e$, by frictional contact only, so as to rotate with the shaft and yet be free to rise thereon, either when the vessel or cylinder C is filled, or when the level of the liquid therein rises, under certain atmospheric conditions hereinabove referred to. The rim or head of the cylinder may have hour indications, or it may have the days of the week marked thereon by suitably spacing the said indications in relation to the rotation of the shaft, or it may have both the indications referred to.

I have shown the cylinder in Fig. 3 as provided with the twenty-four-hour subdivisions. Upon the cylinder C is detachably secured a strip of paper, $C'$, which, if desired, may be laid out in squares corresponding with the hours or fractions thereof, or with the days of the week, or both. To the hollow float-stem is secured a bent arm, $e'$, the free end whereof carries a stylus or a pencil or pen, $p$, the point of which is in contact with the surface of the paper $C'$ and traces thereon the variations in the level of the liquid within the cylinder.

$T'$ is a filling-tube, connected by a suitable joint, $d^4$, to the hollow base, and T is the tube that connects the sphere B with the cylinder through a suitable joint, $d^3$.

It is obvious that instead of rotating the float to rotate the marker, the said marker may be directly operated from the train of clock-gearing; or, instead of this, a non-rotating tracer or marker may be employed, and the cylinder itself may be rotated by the train of clockwork, as shown in the modification in Fig. 5, in which the train of gearing is concealed in the base of the apparatus, and the cylinder provided with a toothed crown-wheel or rim, $C^2$, operated by suitable pinions, $C^3$ $C^3$. The float E in this case is suspended from a cord, $e^2$, that passes over guide-pulleys $P^2$, mounted in suitable bearings, $k$, formed on a forked cross-bar, K, and carries at its free end a counter-weight, $W'$, to which the marker or tracer $p$ is secured, said counter-weight $W'$ being guided in its vertical movements by guide-standards $k'$ $k'$, the cylinder being in this instance contained under a glass bell, L. In this apparatus, T indicates also the tube connecting the porous sphere with the cylinder, and $T'$ the filling-tube.

Having thus described my said invention and how the same is to be performed, what I claim, and desire to secure by Letters Patent, is—

1. The herein-described barometric apparatus, comprising a reservoir provided with means for indicating the level of the liquid therein, a closed porous evaporating-vessel, and a tubular connection between the two for the flow of the liquid from one to the other, substantially as and for the purpose specified.

2. The herein-described barometric apparatus, comprising a multiplicity of reservoirs connected in series, and provided with means for indicating the level of the liquid therein, the reservoir forming the initial of the series being open to the atmosphere, a closed porous evaporating-vessel, and a tubular connection between said vessel and the reservoir forming the terminal of the series, whereby the contents of all the reservoirs may empty into said evaporating-vessel, substantially as and for the purpose specified.

3. The herein-described barometric apparatus, comprising a closed reservoir, a float contained therein, a closed porous evaporating-vessel, a tubular connection between the reservoir and evaporating-vessel to conduct the liquid from one to the other, a marker or tracer connected with the float and operated to automatically mark the variations in the level of the liquid contained in the reservoir upon the surface of the latter, substantially as and for the purpose specified.

4. The herein-described barometric apparatus, comprising a closed cylindrical reservoir, a float contained therein, a closed porous evaporating-vessel, a tubular connection between the two to allow the liquid to flow from one to the other, a marker or tracer operating on the periphery of the reservoir connected and moving with the float, and a time mechanism operating to continuously present to the marker a fresh surface of the reservoir by rotating the same, as described, for the purpose specified.

5. The herein-described barometric apparatus, comprising a cylindrical revoluble reservoir, a float arranged therein, a closed porous evaporating-vessel, a tubular connection between the latter and the reservoir to allow the liquid to flow from one to the other, and a marker or tracer controlled in its movements by the reservoir and float, and operating to trace on the periphery of the reservoir the variations in the level of the liquid therein, substantially as and for the purpose specified.

6. The herein-described barometric apparatus, comprising a revoluble cylindrical reservoir having a peripheral subdivision of days and hours or fractions thereof, a strip of paper detachably secured to said reservoir subdivided into spaces by horizontal and vertical lines corresponding with the subdivisions on the reservoir, a float contained therein, a closed porous evaporating-vessel, a tubular connection between the latter and the reservoir to allow the liquid to flow from one to the other, a time mechanism for rotating the reservoir, and a marker or tracer controlled from the time mechanism and the float, and moving synchronously with both and over the paper on the cylinder, substantially as and for the purpose specified.

In testimony that I claim the foregoing I have hereunto set my hand this 19th day of March, 1886.

ANTONIO BONINO.

Witnesses:
    JOSEPH PETKOWSKIE,
    JULES PAROOL.